(12) United States Patent
Kiesewetter et al.

(10) Patent No.: US 9,284,222 B2
(45) Date of Patent: Mar. 15, 2016

(54) MUCILAGES FOR HYDRAULIC SETTING COMPOSITIONS

(75) Inventors: Rene Kiesewetter, Wietzendorf (DE); Lars Fengler, Bad Fallingbostel (DE)

(73) Assignee: Dow Global Technologies LLC, Midland, MI (US)

(*) Notice: Subject to any disclaimer, the term of this patent is extended or adjusted under 35 U.S.C. 154(b) by 225 days.

(21) Appl. No.: 14/352,322

(22) PCT Filed: Sep. 14, 2012

(86) PCT No.: PCT/US2012/055494
§ 371 (c)(1), (2), (4) Date: Apr. 17, 2014

(87) PCT Pub. No.: WO2012/058912
PCT Pub. Date: Apr. 25, 2013

(65) Prior Publication Data
US 2014/0262023 A1  Sep. 18, 2014

Related U.S. Application Data

(60) Provisional application No. 61/549,849, filed on Oct. 21, 2011.

(51) Int. Cl.
| | |
|---|---|
| *C04B 16/04* | (2006.01) |
| *C04B 16/02* | (2006.01) |
| *C04B 28/04* | (2006.01) |
| *C04B 40/00* | (2006.01) |
| *C04B 111/00* | (2006.01) |

(52) U.S. Cl.
CPC ................. *C04B 16/04* (2013.01); *C04B 16/02* (2013.01); *C04B 28/04* (2013.01); *C04B 40/0042* (2013.01); *C04B 2111/00637* (2013.01); *Y02W 30/97* (2015.05)

(58) Field of Classification Search
CPC ................................ C04B 16/04; C04B 16/02
USPC ...................... 156/336; 106/501.1, 805; 524/5
See application file for complete search history.

(56) References Cited

U.S. PATENT DOCUMENTS

| | | |
|---|---|---|
| 5,387,626 A | 2/1995 | Bohme-Kovac et al. |
| 5,746,546 A | 5/1998 | Hubbs et al. |
| 6,110,271 A | 8/2000 | Skaggs et al. |
| 2004/0055512 A1 | 3/2004 | Nagler |
| 2007/0056480 A1 | 3/2007 | Gray |
| 2010/0037350 A1 | 2/2010 | Zank et al. |
| 2010/0258037 A1* | 10/2010 | Mann ................... C04B 24/383 106/804 |
| 2011/0064872 A1* | 3/2011 | Riehm ................... C04B 26/28 427/136 |

FOREIGN PATENT DOCUMENTS

| | | |
|---|---|---|
| WO | 2007016756 A1 | 2/2007 |
| WO | 2011057605 A2 | 5/2011 |

* cited by examiner

*Primary Examiner* — Daniel Lee
(74) *Attorney, Agent, or Firm* — Andrew E. C. Merriam

(57) ABSTRACT

The present invention provides an additive blend containing cellulose ether and psyllium suitable for use in dry mix compositions containing a hydraulic binder. The dry mix compositions are particularly useful as a mortar composition, especially for tile adhesives because the compositions improve slip resistance of cement containing tile adhesives, the present invention also provides improved cement containing tile adhesives for larger tiles.

9 Claims, No Drawings

MUCILAGES FOR HYDRAULIC SETTING COMPOSITIONS

The present invention relates to an additive blend for use in a dry mix composition and a dry mix composition comprising the additive blend. More particularly it relates to an additive blend comprising cellulose ether and psyllium and a dry mix comprising hydraulic setting material and the additive blend that is useful for hydrating to a mortar for use in construction applications such as tile adhesives.

Hydraulic setting compositions are widely used in the construction industry. For example, they can be used as cement containing tile adhesives for adhering ceramic tiles. The adhesives mainly contain inorganic hydraulic-setting binder, such as cements, and fillers, such as quartz and/or carbonate-containing raw materials. Such hydraulic setting compositions can be provided in the form of a polymer-containing mortar composition, into which additives can be added for improving the technical and physical properties as an adhesive. For example, cellulose ethers and/or starch ethers can be added into such a hydraulic setting composition to improve its thickening effect (consistency) and increase its water retention capacity. However, the effect of these additives has been in general to prolong open time (the period before a skin will form on the tile adhesives), which is known to undesirability reduce the wettability of the tiles and at the same time delay adhesive setting time.

Recently, tile sizes have been increasing. Tiles range in size from less than 2.5 cm×2.5 cm, with mosaics up to 60 cm×60 cm or more. For wall tiles, the sizes are smaller, however here again there is a trend toward larger tiles. See http://www.nationalfloorcoveringalliance.com. There is thus a developing need for cement containing tile adhesives that can meet the needs of users of larger tiles, especially wall tiles.

U.S. patent publication no. 20100258037, to Mann et al. discloses construction materials including hydraulic binders and starch ethers containing high levels of amylopectin in the starch for use as tile adhesives with reduced setting delay as well as shortened open time. However, the compositions in the Mann publication do not address the growing trend towards large tiles.

There remains a need for tile adhesives improving slip resistance especially for use with large tiles; and there is a need in the construction industry for hydraulic setting compositions having a long open time without deteriorating other properties.

The present inventors have sought to solve the problem of providing a hydraulic setting composition that provides excellent slip resistance while providing an acceptable open time and setting delay.

BRIEF SUMMARY OF THE INVENTION

Surprisingly, the presence of psyllium in combination with cellulose ether when included in a dry mix formulation produces a hydraulic setting composition that provides excellent slip resistance while providing an acceptable open time and setting delay.

In a first aspect, the present invention is an additive blend comprising cellulose ether and psyllium wherein the psyllium is present at a concentration of 5 weight-percent or more and 45 weight-percent or less of the combined weight of cellulose ether and psyllium.

In a second aspect, the present invention is a dry mix composition comprising a hydraulic setting binder and the additive blend of the first aspect, wherein cellulose ether is present in an amount ranging from 0.05 to 5 weight-percent, based on the total weight of the dry mix composition.

In a third aspect, the present invention is a method of adhering tiles to a substrate comprising mixing together the dry mix composition of the second aspect with water to form a viscous mortar, applying the mortar to a substrate to form a treated substrate, then applying tile to the thus treated substrate.

The additive blend of the first aspect is useful for making the dry mix composition of the second aspect, which is useful in the tiling process of the third aspect.

DETAILED DESCRIPTION OF THE INVENTION

All phrases comprising parentheses denote either or both of the included parenthetical matter and its absence. For example, the phrase "(meth)acrylate" includes, in the alternative, acrylate and methacrylate.

Unless otherwise stated, the term "EN" stands for European Norm and designates a test method as a prefix to the test method number. European Norm is a standard published by the European Technical Committee for Standardization CEN/TC 67 'Ceramic tiles', Brussels, Belgium. Unless otherwise stated, the test method is the most current test method as of the priority date of this document.

As used herein, the term "weight average molecular weight" means the molecular weight of a polymer or copolymer as determined by gel permeation chromatography against a polyacrylic acid standard.

The additive blend of the present invention comprises psyllium and cellulose ether. The concentration of psyllium in the additive blend is 0.5 weight-percent (wt. %) or more, preferably 0.8 wt. % or more, more one wt. % or more, yet more preferably 3 wt. % or more, still more preferably 5 wt. % or more and at the same time 45 wt. % or less, preferably 40 wt. % or less, more preferably 30 wt. % or less and still more preferably 25 wt. % or less based on the total combined weight of cellulose ether and psyllium.

Psyllium is a natural hydrocolloid material from the group of Psyllium and include Psyllium seed husks. Psyllium seed husks also known as ispaghula, isabgol, or psyllium, are taken from the seeds of the plant genus *Plantago ovate*, a native of India. Psyllium seed husks are soluble or swellable in water, expanding and becoming mucilaginous when wet.

The present invention is a result of discovering that psyllium can readily be admixed with hydraulic setting compositions in conjunction with cellulose ether to improve the performance of the hydraulic setting compositions, particularly for tile adhesive applications. Psyllium can partly replace cellulose ethers in hydraulic setting compositions without deteriorating the overall performance. Further, psyllium can at least partly replace starch ethers, redispersible polymer powders and/or polyacrylamides in a cement containing tile adhesives and in other dry-mortar applications (e.g. renders) without adversely affecting other important features like workability, adhesion strength, and setting delay. In fact, in replacing part of cellulose ether in cement containing tile adhesives, adhesion strengths under various conditions are greatly improved. And as psyllium can readily be obtained on the marketplace, it is priced lower than comparable cobinders currently offered on the market, such as cellulose ethers, polyacrylamides, starch ethers, or galactomannans.

Cellulose ether is used as a water retention agent. Preferably, the cellulose ether is water-soluble and/or organo-soluble, ionic or nonionic cellulose derivatives.

The cellulose ether used in the present invention could be one or more selected from the group consisting of hydroxyalkylcelluloses (e.g., hydroxyethylcellulose (HEC), hydroxypropylcellulose (HPC) and hydroxypropylhydroxyethylcellulose (HPHEC)), carboxy-alkylcelluloses (e.g., carboxymethylcellulose (CMC)), carboxyalkylhydroxyalkylcelluloses (e.g., carboxymethylhydroxyethylcellulose (CMHEC), carboxymethyl-hydroxypropylcellulose (CMHPC)), sulphoalkylcelluloses (e.g., sulphoethylcellulose (SEC), sulphopropylcellulose (SPC)), carboxyalkylsulphoalkylcelluloses (e.g., carboxymethylsulphoethylcellulose (CMSEC), carboxymethylsulphopropylcellulose (CMHPC)), hydroxyalkylsulphoalkylcelluloses (e.g., hydroxyethylsulphoethylcellulose (HESEC), hydroxypropylsulphoethylcellulose (HPSEC) and hydroxyethyl hydroxypropylsulphoethylcellulose (HEHPSEC)), alkylhydroxyalkylsulphoalkyl celluloses (e.g., methylhydroxyethylsulphoethylcellulose (MHESEC), methylhydroxypropylsulphoethyl cellulose (MHPSEC) and methylhydroxyethylhydroxypropylsulphoethyl cellulose (MHEHPSEC)), alkylcelluloses (e.g., methylcellulose (MC), ethylcellulose (EC)), binary or ternary alkylhydroxyalkylcellulose (e.g., hydroxyethylmethylcellulose (NEMC), ethylhydroxyethylcellulose (EHEC), hydroxypropylmethylcellulose (HPMC), ethylhydroxypropylcellulose (EHPC), ethylmethylhydroxyethylcellulose (EMHEC), and ethylmethylhydroxypropylcellulose (EMHPC)), alkenylcelluloses and ionic and nonionic alkenylcellulose mixed ethers (e.g., allylcellulose, allylmethylcellulose, allylethylcellulose and carboxy-methylallylcellulose)), dialkylaminoalkylcelluloses (e.g., N,N-dimethylaminoethylcellulose, N,N-diethylaminoethylcellulose), dialkylaminoalkylhydroxyalkylcelluloses (e.g., N,N-dimethylaminoethylhydroxyethylcellulose and N,N-dimethylaminoethylhydroxypropyl cellulose), aryl-, arylalkyl- and arylhydroxyalkylcelluloses (e.g., benzylcellulose, methylbenzylcellulose and benzylhydroxyethylcellulose), as well as salts thereof (e.g., sodium carboxymethylcellulose ether) and reaction products of the above-stated cellulose ethers with hydrophobically modified glycidyl ethers, which have alkyl residues with $C_3$ to $C_{15}$ carbon atoms or arylalkyl residues with $C_7$ to $C_{15}$ carbon atoms. Microbially produced polysaccharides, such as gum and Welan extraction, isolated naturally occurring polysaccharides (hydrocolloids), such as alginates, xanthan, carrageenan, and galactomannans, may also be used all alone or as blends with cellulose ethers as water retention agents in the present invention.

The additive blend can further comprise additional components besides cellulose ether and psyllium, or can be free from additional components (that is, consist of only cellulose ether and psyllium). Examples of additional components that may be included in the additive blend include: starch ethers, air-entraining agents, accelerating agents, retarders, hydrophobizing agents, superplasticizing agents, defoaming agents, and pigments. It is desirable for the combined weight of cellulose ether and psyllium to be 90 wt. % or more, preferably 95 wt. % or more and can be 100 wt. % of the total weight of the additive blend.

The additive blend is useful for including in a dry mix composition, in particular a dry mix composition that is a hydraulic setting composition. A hydraulic setting composition is a composition that contains an inorganic hydraulic setting binder. An inorganic hydraulic setting binder reacts when wet to bind together. Examples of inorganic hydraulic setting binders include lime containing cement, alkali cement, plaster and gypsum. A particularly desirable inorganic hydraulic setting binder for use in the dry mix of the present invention is cement, more preferably Portland cement, especially the types of CEM I, II, III, IV, and V and/or alumina cement (aluminate cement).

The dry mix composition comprises cellulose ether in a concentration of 0.05 wt. % or more, preferably 0.1 wt. % or more, still more preferably 0.15 wt. % or more and yet more preferably 0.2 wt. % or more and at the same time typically comprises a cellulose ether concentration of 5 wt. % or less, and can comprise 1.5 wt. % or less, even one wt. % or less, with wt. % based on total weight of the dry mix composition. The amount of psyllium is desirably 0.5 weight-percent (wt. %) or more, preferably 0.8 wt. % or more, more one wt. % or more, yet more preferably 3 wt. % or more, still more preferably 5 wt. % or more and at the same time 45 wt. % or less, preferably 40 wt. % or less, more preferably 30 wt. % or less and still more preferably 25 wt. % or less based on the total combined weight of cellulose ether and psyllium in the dry mix composition.

The dry mix composition can further comprise one or more than one filler. Examples of suitable fillers include those selected from a group consisting of silica sand, limestone, chalk, marble, clay, clay, alumina, talc, barite, hollow microspheres, glass and aluminum silicates such as expanded clay, expanded glass and porous fillers based on natural minerals such as foam, pumice and volcanic cinder, and bulking vermiculite.

The inventive dry mix composition typically comprises 1 wt. % or more and can comprise 50 wt. % or more, even 60 wt. % or more and at the same time typically comprises 85 wt. % or less, and can comprise 70 wt. % or less, even 65 wt. % or less of the fillers based on the total dry weight of the hydraulic setting composition.

The inventive dry mix composition can comprise one or more polymeric additive. Desirably, the polymeric additive is selected from a group consisting of redispersible polymer powder, polymer dispersion, starch ether and polyacrylamide.

Redispersible power (RDP) is used as a polymeric additive in a hydraulic setting composition. RDP may be made by spray drying emulsion polymer or a polymer or resin dispersion in the presence of a protective colloid and, optionally, an anti-caking agent. Such polymers may be homopolymers, copolymers or terpolymers of one or more monomers selected from the group consisting of styrene, butadiene, vinyl acetate, versatate, propionate, laurate, vinyl chloride, vinylidene chloride, ethylene, and acrylates, e.g., ethylene/vinylacetate copolymer (vinyl ester-ethylene copolymer), vinylacetate/vinyl-versatate copolymer, and styrene/acrylic copolymer. Dispersion polymers and resins may include, for example, epoxy resins, phenolic resins, and polyolefins, such as polyethylene. Preferably, the RDP is copolymer based on vinyl acetate-ethylene, such as DLP 2000 (available from Dow Wolff Cellulosics, Germany). When mixed with water, the re-dispersible powders can be re-dispersed in water to a size approximating the original average particle size of the emulsion or dispersion, and, in general, no more than 1 micron in average particle size.

The redispersible polymer powder polymeric additive may be one or more redispersible polymer powder including vinyl ester, acrylic, styrene-butadiene, urethane and epoxy powders, preferably a styrene-butadiene having from 0.1 to 5 wt. %, based on the total weight of the redispersible polymer powder, of carboxyl or carboxylate salt functional compounds or copolymerized carboxyl or carboxylate salt monomers, or vinyl acetate-ethylene.

The dry mix composition of the present invention can contain 0.3 wt. % or more and can comprise 0.5 wt. % or more and at the same time can comprise 30 wt. % or less, 20 wt. % or less, 5 wt. % or less, or 2 wt. % or less RDP, with wt. % based on total dry mix composition weight. An excess amount of RDP leads to very costly binders, whereas too little of the RDP provides no setting advantage in use. In refractory cements, the total dry weight of the hydraulic setting composition may comprise 20 to 30 wt. % of RDP. In some highly viscous cellulose ether-psyllium water retention agents where the cellulose ether has limited water retention, it is preferred to limit RDP content to retain open time.

Starch ethers suitable for use in the dry mix compositions of the present invention include, for example, known starches having one or more alkyl, (for example, methyl); hydroxyalkyl; carboxyalkyl (for example, carboxymethyl); cyanoalkyl and carbamoyl ethers.

Starch ethers suitable for use in the present invention include, for example, corn or potato starches etherified by conventional methods, such as reaction with alkylene oxides (hydroxyalkylation) comprising 1 to 20 carbon atoms, such as ethylene and propylene oxide; by carboxyalkylation, with monochloroacetic acid or salts thereof; by alkylation via alkyl halides, for example via methyl chloride, dialkyl carbonate, e.g. dimethyl carbonate (DMC), or dialkyl sulfate, e.g. dimethyl sulfate.

Starch ethers suitable for use in the present invention include substituted starch ethers and hydrophobic starch ethers made by conventional methods and/or starch ethers tempered by conventional methods. Substituted starch ethers can additionally comprise phosphate, phosphonate, sulfate, sulfonate or carboxyl groups, as is achieved for example by reaction of the starch with halogenated carboxylic acids, chlorohydroxyalkyl sulfonates or chlorohydroxyalkyl phosphonates. Hydrophobic starch ethers can be modified by conventional methods with hydrophobic etherification reagents, such as 1 to 20 carbon alkyl glycidyl ethers or epoxides, aromatic glycidyl ethers alkyl or aryl halohydrins, alkyl or aryl carboxylic acids or a quarternary ammonium alkyl or aryl compounds, for example, cresol glycidyl ether, polypropylene diglycol glycidyl ether, tert-butylphenyl glycidyl ether, ethylhexyl glycidyl ether, and hexanediol glycidyl ether.

Starch ethers suitable for use in the present invention can be present as graft polymers or graft copolymers, such as for example with polyvinyl alcohols, acrylamides or monomers or polymers from hydrocarbon monomers.

In the starch ethers of the present invention, the degree of substitution MS (molar substitution: mol substituent/mol glucose unit) is preferably at least 0.0001, 0.001, 0.01, 0.02, 0.03, 0.04, or at least 0.05, 0.06, 0.07, 0.08 or 0.09, most preferably at least 0.1, and up to 2.0, 1.0, 0.8, 0.75, 0.7 or up to 0.6.

Preferably, the starch ethers of the present invention are methyl, ethyl, hydroxyethyl, hydroxypropyl, hydroxybutyl, carboxymethyl, cyanoethyl, carbamoylethyl ether starch, cross-linked forms of any of the foregoing and mixtures thereof.

Suitable amounts of starch ether solids are 5 wt. % or more and at the same time 40 wt. % or less, preferably 30 wt. % or less, still more preferably 20 wt. % or less and yet more preferably 15 wt. % or less, based on the total combined weight of cellulose ether and psyllium. An excess of starch ether will result in longer set times and excessive water sensitivity, whereas too little will not provide the rheology benefit of the starch ether.

Suitable polyacrylamides for use in the present invention include any anionic, cationic and nonionic polyacrylamides having a weight average molecular weight of from 500,000 to $10 \times 10^6$ grams per mole (g/mol). Suitable polyacrylamides include polyacrylamide salt. Polyacrylamides can contain less than 45 wt. % carboxyl functional repeat units, or, preferably, less than 35 wt. %, or, preferably, less than 10 wt. % based on polyacrylamide weight. Suitable anionic polyacrylamides include partially hydrolyzed polyacrylamides, copolymers of acrylamide with alkali metal salts of (meth) acrylic acids, vinylsulfonates and 2-acrylamido-2-methylpropanesulfonates. Suitable cationic polyacrylamides include copolymers of acrylamide with salts or quaternization products of diethylaminoethyl(meth)acrylates, dimethylaminoethyl methacrylate, dimethylaminopropylmethacrylamide, dialkylbisallylammonium salts or aminomethylated polyacrylamide. Suitable nonionogenic polyacrylamides include homopolymers of acrylamide containing small amounts of carboxyl groups formed by in-process hydrolysis.

Dry mix compositions comprising polyacrylamide desirably comprise high viscosity cellulose ethers having a viscosity of 45,000 milliPascals*seconds (mPa·s) (Haake rotational rheometer, 2% solution, 20° C., shear rate 2.55 $s^{-1}$) and above.

Suitable amounts of polyacrylamide solids may range from 0.1 wt. % or more, preferably 0.5 wt. % or more and at the same time are typically 5 wt. % or less, preferably 4 wt. % or less based on the total combined weight of the cellulose ether and psyllium. An excess amount of polyacrylamide will deteriorate open time, whereas too little of it will not confer the setting benefits of the polyacrylamide to the binder.

Other additives that can be present in the inventive dry mix composition can be selected from a group consisting of accelerators, retardants, synthetic thickeners, dispersants, pigments, reducing agents, defoamers, air entraining agents, and polymeric superplasticizers. The inventive hydraulic setting composition typically comprises 0.001 wt. % or more, and at the same time typically comprises 5 wt. % or less of these additives based on the total weight of the dry mix composition.

The dry mix of the present invention is desirably a homogeneous mixture. The dry mixes can be stored and shipped as mixed. If the polymeric additive is provided as a liquid, it can be may be spray applied on starch ethers or cellulose ethers acting as carrier, or co-dried with them, such as by spray drying.

To prepare a mortar or cement from the dry mix composition add water and mix. In a particular desirable use of the dry mix is as a tile adhesive. In such a use, mix water with the dry mix composition of the present invention to form a viscous mortar. Apply the viscous mortar to a substrate to form a treated substrate. Then apply tile to the treated substrate.

The inventive hydraulic setting composition can be used for laying natural stone tiles or ceramic stoneware. Compared with the adhesives in the prior art, the inventive hydraulic setting composition exhibits excellent processing properties, such as easy applying, long open time, low impact on setting retardation, and very good physical properties.

EXAMPLES

In the following examples, a dry mix formulation of cement, fillers, co-binder, and cellulose ether was prepared and then polymeric additives and liquids were prepared in mortar mixer (acc. to EN 196-1, section 4.4) at speed 1 for 3 minutes, letting stand 10 minutes before the final 15 seconds of mixing using a, Tonimix 1551 (Toni Technik Baustoffprüfsysteme GmbH, Berlin, DE) mortar mixer so as to set water demand via according to a given mortar consistency of 670±60 Pascal*seconds (Pa·s) (Brookfield Brookfield Viskometer DV-II+ with spindle set, special coupling, weight ring and helipath stand; cup: 80 mm tall, diameter=100 mm; Spindle: T-F, calibrated in accordance with manufacturer's instructions (Brookfield E.L.V. GmbH (Lorch, DE); Code: 96, @5 rpm, 23 degrees Celsius (° C.)). Tests for the were then run using the formulations as cement containing tile adhesives according to the norms on adhesion (EN 1348) under different test conditions including Normal Storage (28 days (d) at 23° C.); Water Immersion (7 d at 23° C. then 21 days (d) in water immersion) and Heat Conditioning (14 d at 23° C., then 14 d at 70° C. and 1 d at 23° C.), Slip resistance (EN 1308); Open Time (EN 1346); as well as Quick open time (internal test method CE 48.1).

An acceptable level of adhesion (EN 1348) is equal or above 0.5 Newtons per square millimeter ($N/mm^2$), and a preferred level is equal or above 1.0 $N/mm^2$.

An acceptable level of slip resistance (EN 1308) is below 1.0 millimeter (mm), and a preferred level is below 0.5 mm An acceptable level of quick open time is above 50%.

Unpublished test methods used are, as follows:

Quick open time: A test method to determine wettability (CE 48.1) that determines the length of time during which the back of a tile can still be sufficiently wetted with adhesive when laying the tile into a combed bed of tile adhesive. Tiles are laid into a combed bed of tile adhesive at 5 minute intervals and later removed. Subsequently, the wetting of the rear of the tile is assessed. In more detail: Put 100 grams (g) of the tile adhesive into a 200 milliliter (mL) beaker, while stirring, then add water as needed to achieve the desired mortar consistency and start a stop watch. Stir for 1.0 minute (min) and then allow the tile adhesive to rest for 3 min; stir again for 1.0 min. Then lay the tile by buttering the test tile adhesive onto a fibre-reinforced cement board (Eterplan N (40 cm×20 cm), Eternit AG, Heidelberg, DE) with a spatula and comb the tile adhesive at an angle of 60°) using a 4×4 mm notched trowel. Set the stopwatch to zero and, after 5 min, lay an Earthenware tile (5×5 centimeter (cm) having a water absorbing capacity of 15±3% in accordance with EN 14411 from 2007-03) into the adhesive and weight the top (front) side of the tile with a 3 kilogram (kg) weight for 30 seconds. After 10, 15, 20, 25 and 30 min lay further analyte tiles and weight them with the 3 kg weight for 30 sec in the manner stated above. After 40 min remove all the tiles and turn them back to front. The wetting of the rear of the tile with adhesive is determined by counting with the aid of a template (10×10 squares of 5 mm each), rounding the count to ±5%. The open time is stated as the time in minutes, during which the wetting of the rear of the tile amounts to ≥50%.

Formulation materials: Tested included the following:

Ordinary Portland Cement (OPC) Type CEM I 52.5 R (Heidelberg Zement, Germany).

Silica sand type F 32 and type F 36 (Quarzwerke Frechen, Germany).

Redispersible powder DLP 2000 vinyl acetate-ethylene (VA/E polymer) (Dow Wolff Cellulosics, Germany).

Walocel™ MKX 60000 PF01 hydroxyethyl methyl cellulose (HEMC) (Viscosity ~60,000 milliPascals*seconds (mPa·s) (Haake rotational rheometer, 2% solution, 20° C., shear rate 2.55 $s^{-1}$)), Walocel is a trademark of The Dow Chemical Company.

Walocel™ MW 40000 PFV HEMC (Viscosity ~40,000 mPa·s (Haake rotational rheometer, 2% solution, 20° C., shear rate 2.55 $s^{-1}$)).

Walocel™ MW 60000 PFV HEMC (Viscosity ~60,000 mPa·s (Haake rotational rheometer, 2% solution, 20° C., shear rate 2.55 $s^{-1}$)).

Walocel™ MKS 15000 PF01 hydroxypropyl methyl cellulose (HPMC) (Viscosity ~15,000 mPa·s (Haake rotational rheometer, 2% solution, 20° C., shear rate 2.55 $s^{-1}$)).

MTW 8000 PF10 (methylhydroxyethyl cellulose, Viscosity ~8,000 mPa·s (Haake rotational rheometer, 2% solution, 20° C., shear rate 2.55 $s^{-1}$)).

Psyllium Husk (95%) 60 mesh (viscosity: 2900 mPas (2% aqueous solution, D=2.5 s-1); (Golden Peanut Rüschweg, Wulfsen, Germany).

Mebofix™ 50 Accelerator (Calcium formate), Lanxess (Leverkusen; Germany).

Polyacrylamide (slightly anionic, pH ~7.0 as 0.1 wt. % aq. solution, Praestol™ 2510, Ashland Deutschland GmbH, Krefeld, DE). Praestol is a trademark of Ashland Licensing and Intellectual Proplerty LLC.

Polyacrylamide (30-40 wt. % hydrolyzed Floset™ DP/135 N; SNF Floerger, Andrézieu, FR). Floset is a trademark of S.P.C.M. SA Joint Stock Company, France.

Amitrolit™ 8860 Hydroxypropyl starch ether (Agrana Stärke GmbH, Austria) (viscosity in water: 1,200-1,600 mPas (5%, Brookfield 50 rpm)); and Amitrolit™ 8869 Hydroxypropyl starch ether (Agrana) (viscosity in water: 3,500-7,000 mPas (5%; Brookfield 50 rpm)). Amitrolit is a trademark of Agrana starch.

Examples 1A, 2 and 3

Demonstrate the impact of psyllium in an RDP containing dry mix formulation in comparison to a dry mix composition without the psyllium and instead of using polyacrylamide. The formulations are set forth in Table 1, below with values presented as wt. %. The results of tile adhesive testing of the formulations are set forth in Table 2, below.

TABLE 1

Cementitious Tile Adhesives Containing Psyllium

| Example | 1A* | 2 | 3 |
|---|---|---|---|
| A) Cement | | | |
| CEM I 52,5 R | 35.0 | 35.0 | 35.0 |
| Quarzsand F32 | 30.80 | 30.80 | 30.80 |
| Quarzsand F36 | 30.80 | 30.80 | 30.80 |
| DLP 2000 RDP | 2.5 | 2.5 | 2.5 |
| Calcium formate | 0.5 | 0.5 | 0.5 |
| | 100% | 100% | 100% |
| B) Additive Blend | 0.40 | 0.40 | 0.40 |
| MKS 15000 PF 01 (% in B) | 67.0 | 46.0 | 34.0 |
| Starch ether (Amitrolit 8869) (% in B) | 30.0 | 30.0 | 30.0 |
| Psyllium husk seed (% in B) 100% < 0.250 mm % (=60 mesh) | | 24.0 | 36.0 |
| Polyacrylamide (Floset DP/135N) % | 3.0 | | |

*Denotes Comparative Example

Values are in wt. % based on either Cement weight or Additive Blend weight, depending on which group the material belongs, unless otherwise noted.

As shown in Table 2, below, the dry mix composition containing psyllium and RDP when used as a tile adhesive in Example 2 improves slip resistance, open time and adhesion after normal climate conditioning without negatively affecting quick open time. As shown in Example 3, however, only a 36 wt. % replacement of cellulose ether with psyllium negatively impacted slip resistance in a formulation with a higher water retaining (low viscosity) cellulose ether.

TABLE 2

Test Results For Formulations in Table 1

| Example | 1A* | 2 | 3 |
|---|---|---|---|
| Water:Solids ratio (w/w) | 0.275 | 0.265 | 0.265 |
| Slip (EN 1308) (mm) | 0.30 | 0.25 | 14.00 |
| Quick Open Time CE 48.1 (%) | | | |
| 5 Min. | 100 | 100 | 100 |
| 10 Min. | 100 | 100 | 95 |
| 15 Min. | 100 | 100 | 85 |
| 20 Min. | 95 | 95 | 35 |
| 25 Min. | 75 | 25 | 5 |
| 30 Min. | 55 | 5 | 0 |
| Adhesion (EN 1348) (N/mm2) | | | |
| Normal Storage | 1.11 | 1.34 | 1.31 |
| Water Immersion | 0.83 | 0.97 | 0.95 |
| Heat Conditioning | 0.83 | 0.97 | 0.79 |
| Open Time (EN1346) (N/mm2) | | | |
| 30 min. | 1.00 | 1.46 | 1.27 |
| 40 min. | 0.58 | 1.19 | 0.77 |

*Denotes Comparative Example

TABLE 4

Test Results For Formulations in Table 3

| Example | 4A* | 5A* | 6 | 7 | 8 | 9 |
|---|---|---|---|---|---|---|
| Water:Solids ratio (w/w) | 0.225 | 0.24 | 0.24 | 0.25 | 0.255 | 0.26 |
| Slip (EN 1308) (mm) | 1.50 | 1.30 | 1.30 | 1.00 | 0.60 | 0.65 |
| Quick Open Time CE 48.1 (%) | | | | | | |
| 5 Min. | 95 | 75 | 70 | 85 | 80 | 70 |
| 10 Min. | 40 | 55 | 40 | 55 | 75 | 60 |
| 15 Min. | 15 | 35 | 40 | 55 | 50 | 5 |
| 20 Min. | 10 | 10 | 15 | 20 | 0 | 0 |
| 25 Min. | 10 | 10 | 5 | 10 | 0 | 0 |
| 30 Min. | 0 | 0 | 0 | 5 | 0 | 0 |
| Adhesion (EN 1348) (N/mm$^2$) | | | | | | |
| Normal Storage | 1.09 | 0.90 | 1.02 | 1.16 | 1.06 | 0.99 |
| Water Immersion | 0.73 | 0.87 | 0.73 | 0.80 | 0.86 | 0.88 |
| Heat Conditioning | 0.76 | 0.83 | 0.84 | 0.73 | 0.74 | 0.77 |
| Open Time (EN1346) (N/mm$^2$) | | | | | | |
| 30 min. | 0.49 | 0.45 | 0.42 | 0.48 | 0.41 | 0.57 |
| 40 min. | 0.30 | 0.34 | 0.24 | 0.35 | 0.34 | 0.34 |

*Denotes Comparative Example

Examples 4A, 5A, 6, 7, 8 and 9

Demonstrate the impact of psyllium in an RDP containing dry mix formulation in comparison to a dry mix composition without the psyllium and instead of using starch ether. The formulations are set forth in Table 3, below. The results of tile adhesive testing of the formulations are set forth in Table 4, below.

As shown in Table 4, above, replacing 20% of a cellulose ether with psyllium, as in Example 6, improves yield (water solid ratio), slip resistance, wet mortar open time without adversely affecting quick open time. As shown in Examples 7, 8 and 9, replacing up to 50% of the cellulose ether with psyllium improves slip resistance, normal and wet adhesion and open time (compare Example 4A). Even in comparison to starch ether in comparative Example 5a, replacement of 20% of cellulose ether with psyllium in Example 6 provides

TABLE 3

Cementitious Tile Adhesives Containing Psyllium

| Example | 4A* | 5A* | 6 | 7 | 8 | 9 |
|---|---|---|---|---|---|---|
| A) Cement | | | | | | |
| OPC 52,5 R (Milke) | 35.0 | 35.0 | 35.0 | 35.0 | 35.0 | 35.0 |
| Quarzsand F32 | 30.80 | 30.80 | 30.80 | 30.80 | 30.80 | 30.80 |
| Quarzsand F36 | 30.80 | 30.80 | 30.80 | 30.80 | 30.80 | 30.80 |
| RDP (DLP 2000) | 2.5 | 2.5 | 2.5 | 2.5 | 2.5 | 2.5 |
| Calcium formate | 0.5 | 0.5 | 0.5 | 0.5 | 0.5 | 0.5 |
| | 100% | 100% | 100% | 100% | 100% | 100% |
| B) Additive Blend | 0.40 | 0.40 | 0.40 | 0.40 | 0.40 | 0.40 |
| Walocel MKX 60000 PF01 % | 100.0 | 80.0 | 80.0 | 70.0 | 60.0 | 50.0 |
| Starch Ether (Amitrolit ™ 8860) % | | 20.0 | | | | |
| Psyllium husk seed 100% < 0.250 mm % (=60 mesh) | | | 20.0 | 30.0 | 40.0 | 50.0 |
| Viscosity of Additive Blend in water (2%, D = 2.5 s$^{-1}$)** | 63000 | 19900 | 34200 | 25200 | 18600 | 13700 |

*Denotes Comparative Example;

**Haake rotational rheometer, 2% solution, 20° C., shear rate 2.55 s$^{-1}$ (Thermo Fisher Scientific, Inc. Karlsruhe, DE)

Values are in wt. % based on either Cement weight or Additive Blend weight, depending on which group the material belongs, unless otherwise noted.

improved slip resistance and normal adhesion without greatly impacting open time or quick open time in the first 20 to 30 minutes. All of Examples 6, 7, 8 and 9 exhibit improved slip resistance regardless of psyllium dosage. It is not until one replaces from 40 and 50% of cellulose ether with psyllium in Examples 8 and 9 that one sees an adverse impact on quick open time. Accordingly, psyllium may either fully or partly replace starch ether.

Examples 10A, 11A, 12, 13 and 14

Demonstrate the impact of psyllium in an RDP containing dry mix formulation in comparison to a composition without the psyllium and instead of using starch ether. The formulations are set forth in Table 5, below. The results of tile adhesive testing of the formulations are set forth in Table 6, below.

TABLE 5

Cementitious Tile Adhesives Containing Psyllium

| Example | 10A* | 11A* | 12 | 13 | 14 |
|---|---|---|---|---|---|
| OPC 52,5 R (Milke) | 35.0 | 35.0 | 35.0 | 35.0 | 35.0 |
| Quarzsand F32 | 30.80 | 30.80 | 30.80 | 30.80 | 30.80 |
| Quarzsand F36 | 30.80 | 30.80 | 30.80 | 30.80 | 30.80 |
| RDP (DLP 2000) | 2.5 | 2.5 | 2.5 | 2.5 | 2.5 |
| Calcium formate | 0.5 | 0.5 | 0.5 | 0.5 | 0.5 |
|  | 100% | 100% | 100% | 100% | 100% |
| B) Additive Blend | 0.40 | 0.40 | 0.40 | 0.40 | 0.40 |
| Walocel MKX 60000 PF01 % | 100.0 | 99.0 | 99.0 | 95.0 | 90.0 |
| Polyacrylamide Praestol ™ 2510 % |  | 1.0 |  |  |  |
| Psyllium husk seed 100% < 0.250 mm % (=60 mesh) |  |  | 1.0 | 5.0 | 10.0 |
| Viscosity of Additive Blend in water (2%, D = 2.5 s$^{-1}$)** | 63000 | 58700 | 61000 | 54000 | 46100 |

*Denotes Comparative Example;

**Haake rotational rheometer, 2% solution, 20° C., shear rate 2.55 s$^{-1}$

Values are in wt. % based on either Cement weight or Additive Blend weight, depending on which group the material belongs, unless otherwise noted.

TABLE 6

Test Results For Formulations in Table 5

| Example | 10A* | 11A* | 12 | 13 | 14 |
|---|---|---|---|---|---|
| Water solid ratio | 0.225 | 0.23 | 0.23 | 0.23 | 0.235 |
| Slip (mm) (EN 1308) | 1.50 | 1.80 | 1.65 | 1.60 | 0.85 |
| Quick Open Time CE 48.1 (%) |  |  |  |  |  |
| 5 Min. | 95 | 95 | 60 | 65 | 90 |
| 10 Min. | 40 | 40 | 55 | 55 | 60 |
| 15 Min. | 15 | 10 | 45 | 20 | 25 |
| 20 Min. | 10 | 5 | 20 | 10 | 5 |
| 25 Min. | 10 | 5 | 15 | 5 | 0 |
| 30 Min. | 0 | 0 | 5 | 0 | 0 |
| Adhesion (EN 1348) (N/mm$^2$) |  |  |  |  |  |
| Normal Storage | 1.09 | 1.02 | 1.19 | 1.05 | 1.08 |
| Water Immersion | 0.73 | 1.02 | 1.02 | 0.92 | 0.85 |
| Heat Conditioning Open Time (EN1346) (N/mm$^2$) | 0.76 | 0.72 | 0.73 | 0.84 | 0.68 |
| 30 min. | 0.49 | 0.55 | 0.57 | 0.50 | 0.29 |

*Denotes Comparative Example

As shown in Table 6, below, replacing cellulose ether in Example 10A with small amounts of psyllium in Examples 12, 13 and 14 improves slip resistance and quick open time without adversely impacting adhesion. At 1% replacement of cellulose ether in Example 12, the psyllium outperforms polyacrylamide in Example 11A in adhesion, open time and slip. As shown in Examples 6, 7, and 8 above in Table 4, even higher dosages of psyllium at or below 40 wt. % of total water retention agents may help quick open time to a limited extent and maintain open time. However, lower amounts of psyllium at 10% hurt open time in the cellulose ether of this example which has a low water retention and a very high viscosity.

TABLE 7

Cementitious Tile Adhesives Containing Psyllium

| Example | 15A* | 16A* | 17 | 18 | 19 |
|---|---|---|---|---|---|
| OPC 42,5 R (Holcim, Germany) | 35.0 | 35.0 | 35.0 | 35.0 | 35.0 |
| Silica sand F32 (Quarzwerke Frechen, Germany) | 31.80 | 31.80 | 31.80 | 31.80 | 31.80 |
| Silica sand F36 (Quarzwerke Frechen, Germany) | 31.85 | 31.85 | 31.85 | 31.85 | 31.85 |
| RDPowder DLP 2000 (DWC, Germany | 1.0 | 1.0 | 1.0 | 1.0 | 1.0 |
|  | 100% | 100% | 100% | 100% | 100% |
| Additive Blend: | 0.35 | 0.35 | 0.35 | 0.35 | 0.35 |
| Walocel MW 40000 PFV (DWC; Germany) | 100.0 |  |  |  |  |
| Walocel MW 60000 PFV (DWC; Germany) |  | 100.0 | 85.0 | 75.0 | 65.0 |
| Psyllium Husk seed (95%) 60 mesh |  |  | 15.0 | 25.0 | 35.0 |
| Viscosity of Additive Blend in water (2%; D = 2.5 sec−1)** | 39900 | 65000 | 42000 | 30000 | 22000 |

*Denotes Comparative Example;
**Haake rotational rheometer, 2% solution, 20° C., shear rate 2.55 s$^{-1}$
Values are in wt. % based on either Cement weight or Additive Blend weight, depending on which group the material belongs, unless otherwise noted.

Examples 15A, 16A, 17, 18 and 19

Demonstrate the impact of psyllium in an RDP containing dry mix formulation in comparison to a composition without the psyllium and instead of using starch ether. The formulations are set forth in Table 7, below. The results of tile adhesive testing of the formulations are set forth in Table 8, above.

TABLE 8

Test Results For Formulations in Table 7

| Example | 15A* | 16A* | 17 | 18 | 19 |
|---|---|---|---|---|---|
| Water solid ratio | 0.24 | 0.25 | 0.25 | 0.25 | 0.25 |
| Slip (mm) (EN 1308) | 13.00 | 13.00 | 4.50 | 1.40 | 1.20 |
| Quick Open Time CE 48.1 (%) | | | | | |
| 5 Min. | 100 | 100 | 100 | 100 | 100 |
| 10 Min. | 95 | 95 | 100 | 100 | 100 |
| 15 Min. | 90 | 85 | 90 | 95 | 90 |
| 20 Min. | 55 | 50 | 75 | 85 | 85 |
| 25 Min. | 35 | 30 | 20 | 25 | 50 |
| 30 Min. | 0 | 0 | 0 | 0 | 0 |
| Adhesion (EN 1348) (N/mm$^2$) | | | | | |
| Normal Storage | 1.12 | 1.21 | 1.18 | 0.98 | 1.12 |
| Water Immersion | 0.88 | 0.75 | 0.90 | 0.87 | 0.97 |
| Heat Conditioning | 0.58 | 0.57 | 0.52 | 0.56 | 0.62 |
| Open Time (EN1346) (N/mm$^2$) | | | | | |
| 20 min. | 1.11 | 1.12 | 0.91 | 0.72 | 0.58 |
| 30 min. | 0.71 | 0.68 | 0.54 | 0.43 | 0.39 |

*Denotes Comparative Example

As shown in Table 8, above, replacing cellulose ether in Example 15A or 16A with psyllium in Examples 17, 18 and 19 dramatically improve slip resistance and quick open time and tend to improve or maintain adhesion. The improvement in slip resistance makes the composition of the present invention highly desirable for use in cementing large tiles in place, especially wall tiles. The psyllium also reduces viscosity and thereby improves efficiency in mixing. At 35 wt % replacement of cellulose ether in Example 19, amounts of psyllium approaching 35 wt % improved slip in this higher viscosity cellulose ether grade; however, slip at the lower cellulose ether dosage in these examples is not as good as it is in Examples 6-9.

The invention claimed is:

1. An additive blend comprising cellulose ether and psyllium wherein the psyllium is present in a concentration of 0.5 weight-percent or more and 45 weight-percent or less based on the combined weight of cellulose ether and psyllium.

2. The additive blend of claim 1, further comprising one or more than one additive selected from the group consisting of starch ethers, air-entraining agents, accelerating agents, retarders, hydrophobizing agents, superplasticizing agents, defoaming agents, and pigments.

3. The additive blend of claim 1, further characterized by the combined weight of cellulose either and psyllium being 90 weight-percent or more of the total additive blend weight.

4. A dry mix composition comprising an inorganic hydraulic setting binder and the additive blend of claim 1, wherein cellulose ether is present in an amount ranging from 0.05 to 5 weight-percent, based on the total weight of the dry mix composition.

5. The dry mix composition of claim 4, further comprising one or more polymeric additives chosen from redispersible polymer powder, starch ether, and polyacrylamide.

6. The dry mix composition of claim 5, wherein the polymeric additive is redispersible polymer powder in an amount ranging from 0.3 to 30 weight-percent, based on the total weight of the dry mix composition.

7. The composition of claim 5, wherein the polymeric additive includes one or more starch ethers in an amount ranging from 5 to 40 weight-percent, based on the total solids weight of the starch ether and cellulose ether.

8. The dry mix composition of any of claim 5, wherein the polymeric additive comprises one or more polyacrylamides or salts thereof in amounts of polyacrylamide solids ranging from 0.1 to 10 weight-percent, based on the total combined weight of cellulose ether and psyllium in the dry mix composition.

9. A method of adhering tiles to a substrate comprising mixing together the dry mix composition as claimed in claim 4 with water to form a viscous mortar, applying the mortar to a substrate to form a treated substrate, then applying tile to the treated substrate.

* * * * *